United States Patent
Arumugam et al.

(10) Patent No.: US 10,956,203 B2
(45) Date of Patent: Mar. 23, 2021

(54) QUALITY ASSURANCE FOR A CONTEXT DRIVEN HYBRID TRANSACTION PROCESSING SYSTEM

(71) Applicant: International Business Machines Corporation, Armonk, NY (US)

(72) Inventors: Sakthimurugan Arumugam, Bangalore (IN); Harshavardhana M. P, Whitefield (IN); Jithesh Moothoor, S. Medahalli (IN); Hariharan Venkitachalam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/369,061

(22) Filed: Mar. 29, 2019

(65) Prior Publication Data

US 2020/0310860 A1    Oct. 1, 2020

(51) Int. Cl.
| | |
|---|---|
| *G06F 9/44* | (2018.01) |
| *G06F 9/46* | (2006.01) |
| *G06F 9/54* | (2006.01) |
| *G06F 16/23* | (2019.01) |
| *G06Q 20/10* | (2012.01) |

(52) U.S. Cl.
CPC .............. *G06F 9/466* (2013.01); *G06F 9/542* (2013.01); *G06F 9/546* (2013.01); *G06F 16/2379* (2019.01); *G06Q 20/108* (2013.01)

(58) Field of Classification Search
CPC ...... G06F 9/466; G06F 16/2379; G06F 9/542; G06F 9/546
See application file for complete search history.

(56) References Cited

U.S. PATENT DOCUMENTS

| | | | |
|---|---|---|---|
| 5,680,610 A * | 10/1997 | Smith | ................. G06F 11/3684 |
| 6,243,862 B1 | 6/2001 | Lebow | |
| 6,275,843 B1 | 8/2001 | Chorn | |
| 7,792,896 B2 | 9/2010 | Cohen et al. | |
| 7,877,733 B2 | 1/2011 | Parkinson et al. | |
| 8,151,247 B2 | 4/2012 | Wefers | |
| 8,918,367 B2 | 12/2014 | Manolov et al. | |
| 2003/0229825 A1* | 12/2003 | Barry | ................. G06F 11/3672 |
| | | | 714/38.14 |

(Continued)

FOREIGN PATENT DOCUMENTS

CN          103793328 A          5/2014

OTHER PUBLICATIONS

Deng et al, "Testing Database Transaction Concurrency", 18th IEEE International Conference on Automated Software Engineering, Montreal, Que. Canada, Oct. 6-10, 2003, 10 pages.

(Continued)

*Primary Examiner* — Hang Pan
(74) *Attorney, Agent, or Firm* — Edward J. Wixted, III

(57) ABSTRACT

A two-phase commit online transaction processing system injects a set of test cases into a logical unit of work (LUW) associated with a transaction. Performance of the test cases, by respective transaction process monitors (TPMs), serves to predict the outcome of the LUW processes, before the TPMs vote with respect to committing or rolling back the transaction. The system contributes to improved transaction process quality assurance by detecting potential problems before the LUW is committed.

14 Claims, 10 Drawing Sheets

(56) References Cited

U.S. PATENT DOCUMENTS

2009/0172153 A1* 7/2009 Cohen ................... H04L 67/02
709/224
2016/0378382 A1* 12/2016 Busaba ................ G06F 3/0622
711/150

OTHER PUBLICATIONS

Ibrahim, "Transactional Workflow Technique for Distributed Transaction Processing", International Journal of Soft Computing, Oct. 6, Egypt, © Medwell Journals 2007, 8 pages, <http://docsdrive.com/pdfs/medwelljournals/ijscomp/2017/343-350.pdf>.

* cited by examiner

QUALITY ASSURANCE FOR A CONTEXT DRIVEN HYBRID TRANSACTION PROCESSING SYSTEM

BACKGROUND

The present invention relates generally to the field of online transaction processing, and more particularly to context driven end to end quality assurance in a hybrid online transaction processing environment. Examples of hybrid transaction processing systems include systems for order entry, retail sales, and financial transactions, to name just a few.

In a hybrid online transaction processing environment for transaction processing, a LUW may span across multiple resource managers and transaction process monitors, sometimes herein referred to as transaction managers. The "terms transaction process monitor" and "transaction manager" as used herein are synonymous and may be used interchangeably. To ensure integrity of a transaction, all processes in an LUW must be completed, or none of them will be completed. If any process in an LUW fails, all resource updates performed in processing the LUW must be cancelled or rolled back as if processing of the LUW had not been started.

Resource managers and transaction process monitors operate in a complex architecture, spanning different geographies and heterogeneous systems, and may operate within X/Open Distributed Transaction Processing Standard, also known as extended architecture (XA) standard. A process that conforms to XA standard is herein referred to as an extended architecture process (XA process). Under the XA standard, a transaction process monitor coordinates operation of any number of transaction participants using a two-phase commit protocol (2PC) to ensure data consistency with respect to the transaction.

SUMMARY

According to an aspect of the present invention, there is a method, computer program product and/or system that performs the following operations (not necessarily in the following order): (i) receiving, from a client application, a first request to perform an online transaction, wherein the first request comprises a logical unit of work, and a transaction identifier; (ii) in response to receiving the first request, sending a second request, to a test center, for a test case based on the transaction identifier; (iii) receiving, from the test center, the test case; (iv) in response to receiving the test case, injecting the test case into the logical unit of work to generate an injected logical unit of work; (v) sending the injected logical unit of work to a transaction participant; (vi) receiving, from the transaction participant, a "test successful" message; (vii) in response to receiving the "test successful" message, sending to the transaction participant, an "execute transaction" message; (viii) receiving, from the transaction participant, an "execute transaction OK" message; (ix) in response to receiving the "execute transaction OK" message, sending to the transaction participant, a "commit" message; (x) receiving, from the transaction participant, a "commit done" message; and (xi) in response to receiving the "commit done" message, sending a "transaction complete" message to the client application. The sending and receiving respectively to and from the transaction participant, are performed in conformance with a two-phase commit protocol.

DETAILED DESCRIPTION

Figure 1A:
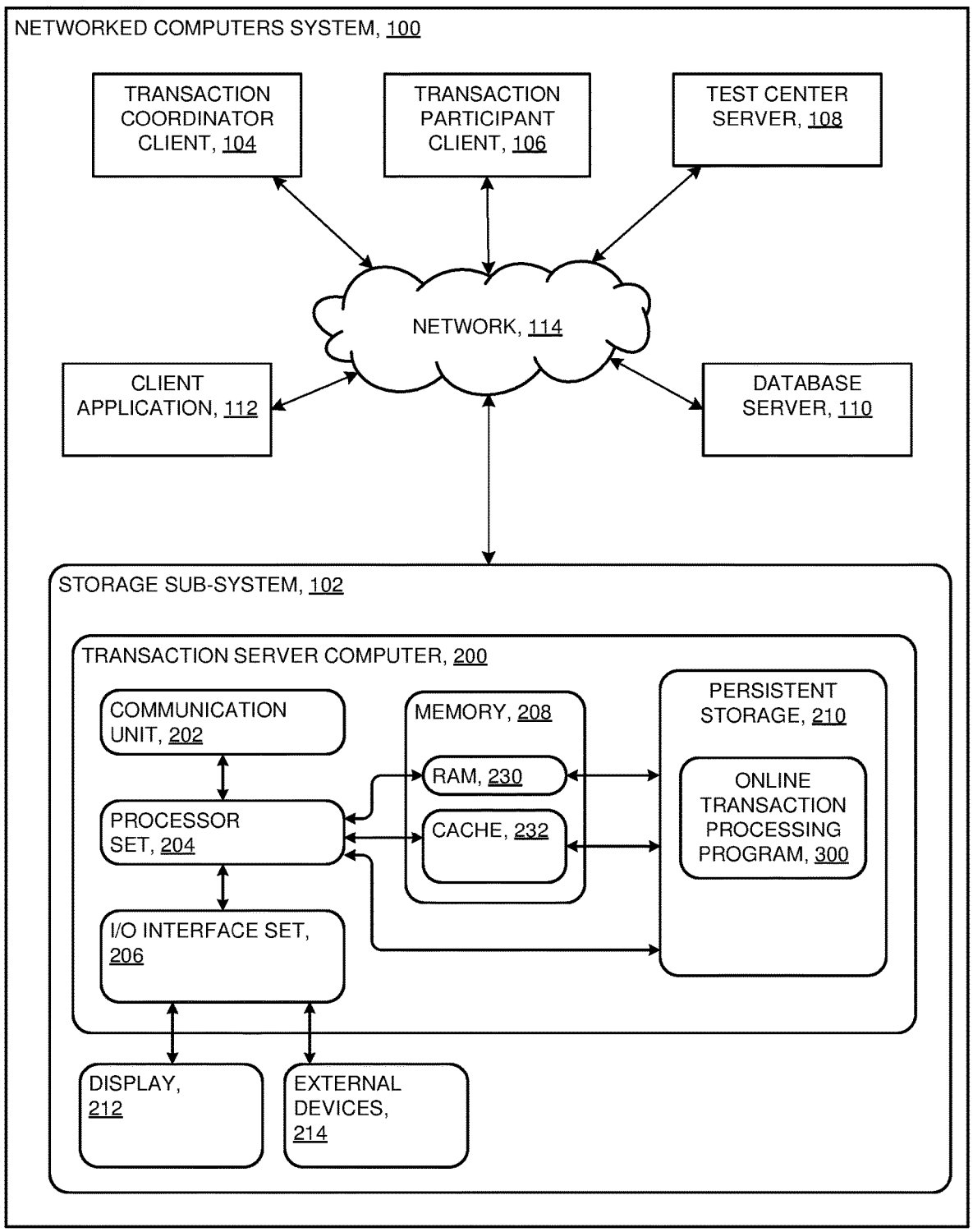
FIG. 1A is a functional block diagram of a first embodiment of a system according to the present invention.

An online transaction processing system that conforms to a two-phase commit protocol performs a logical unit of work (LUW) corresponding to a transaction. Some embodiments of the present invention enhance the two-phase commit protocol by injecting a set of test cases into the LUW. Performance of the test cases, by a transaction coordinator and respective transaction process monitors (TPMs) involved in processing the LUW, serves to predict the outcome of the LUW processes, before the TPMs vote with respect to committing or rolling back the transaction. Embodiments of the present invention thereby contribute to improved transaction process quality assurance in at least the following ways: (i) if all involved transaction process monitors perform their respective test cases without error, the transaction has a greater probability of being performed without errors than would be the case had the testing not been done; and (ii) if a test case results in an error, the corresponding TPM may vote to cancel the transaction (roll it back), thereby preventing a potential transaction error from being committed. In case the context changes from a current context (such as "voting") to a new context (such as "rollback"), the test cases are automatically and dynamically changed to reflect the new context, thereby ensuring that the test cases are in keeping with the context of the transaction flow.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
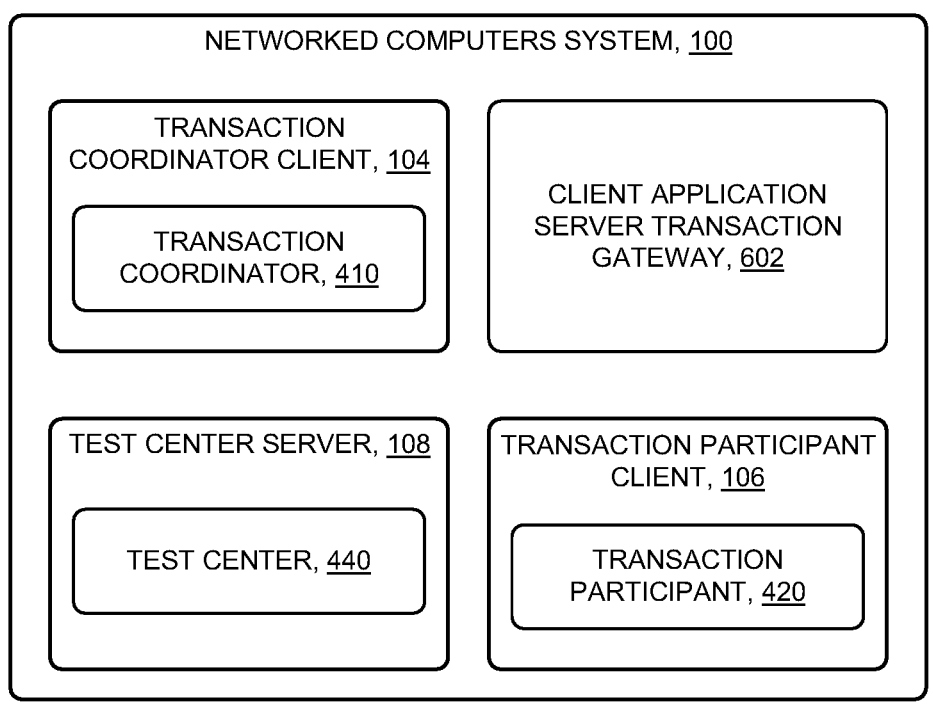
FIG. 1B is a functional block diagram of a first embodiment of a system according to the present invention.

An embodiment of a possible hardware and software environment for software and/or methods according to the present invention will now be described in detail with reference to the Figures. FIGS. 1A and 1B are functional block diagrams illustrating various portions of networked computers system 100.

Referring to FIG. 1A, networked computers system 100 includes: storage sub-system 102; transaction coordinator client 104; transaction participant client 106; test center server 108; database server 110; client application 112;

communication network 114; transaction server computer 200; communications unit 202; processor set 204; input/output (I/O) interface set 206; memory device 208; persistent storage device 210; display device 212; external device set 214; random access memory (RAM) devices 230; cache memory device 232; online transaction processing program (OLTP program 300).

Referring to FIG. 1B, networked computers system 100 further includes: transaction coordinator (TPM1 410) of transaction coordinator client 104; transaction participant (TPM2 420) of transaction participant client 106; test center 440 of test center server 108; and client application server transaction gateway 602.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. OLTP program 300 is a collection of machine readable instructions and/or data that is used to create, manage, and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for storage sub-system 102; and/or (ii) devices external to storage sub-system 102 may be able to provide memory for storage sub-system 102.

OLTP program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

OLTP program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with transaction server computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, OLTP program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
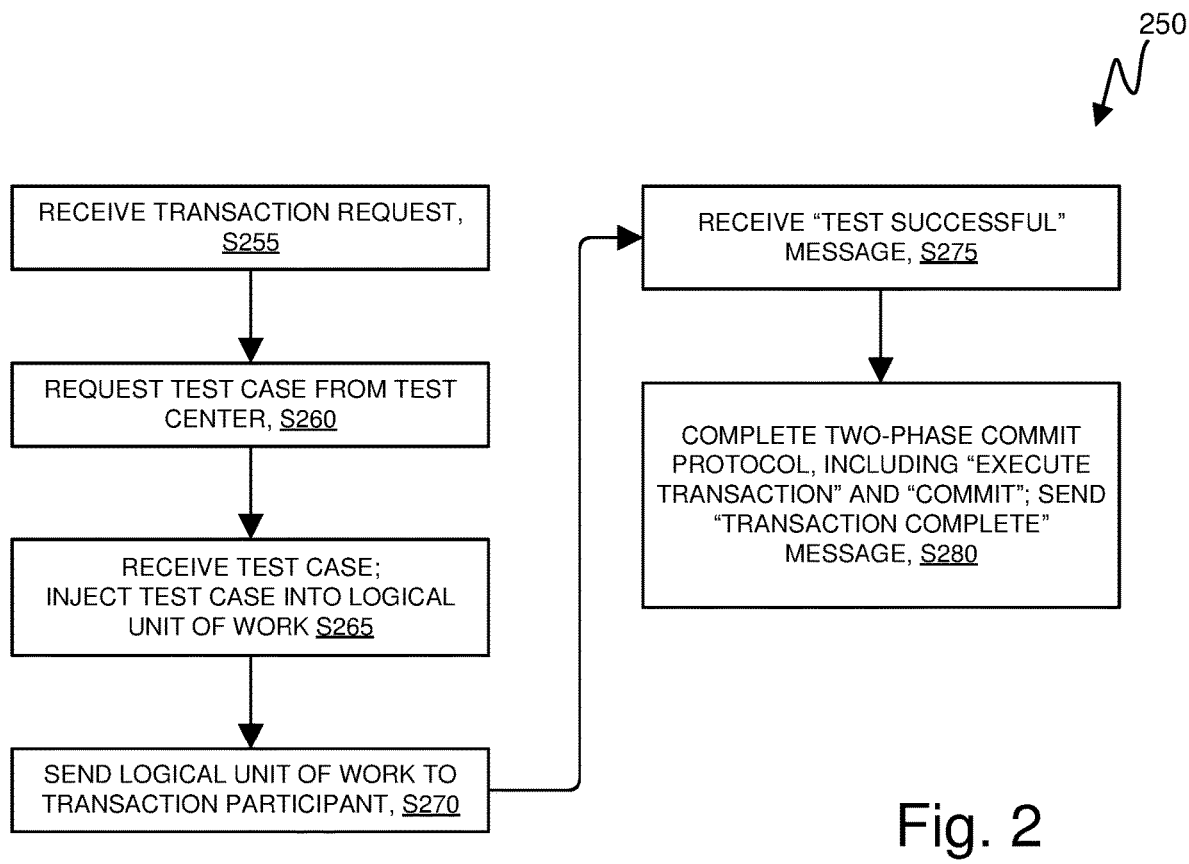
FIG. 2 is a flowchart showing a first embodiment method performed, at least in part, by the first embodiment system.
Figure 3:
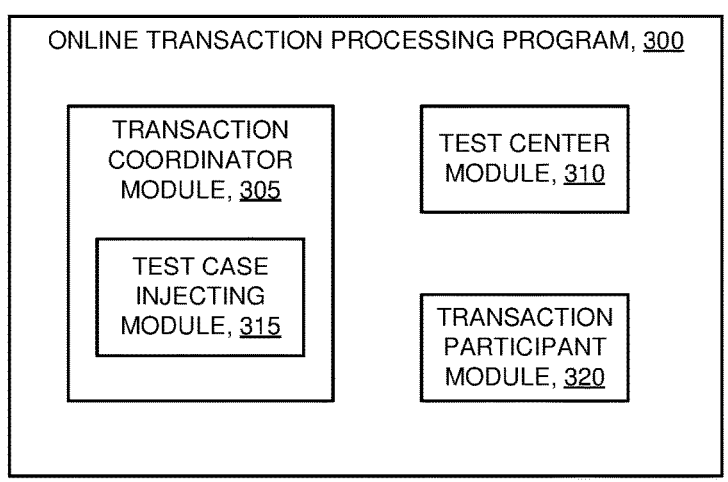
FIG. 3 is a block diagram showing a machine logic (for example, software) portion of the first embodiment system.

FIG. 2 shows flowchart 250 depicting a method according to the present invention. FIG. 3 shows OLTP program 300 for performing at least some of the method operations of flowchart 250. This method and associated software will now be discussed, over the course of the following paragraphs, with reference to FIG. 2 (for the method operation blocks) and FIG. 3 (for the software blocks).

Processing begins at operation S255, where transaction coordinator module 305, of online transaction processing OLTP program 300 receives a transaction request from client application 112 (See FIG. 1A). In some embodiments, the transaction request, and operations performed in carrying out the request, conform to X/Open Distributed Transaction Processing Standard for online transaction processing. A logical unit of work defines actions that are to be carried out in processing the transaction request. The actions defined in the logical unit of work must either all be carried out successfully (completed without error, and within a pre-defined time limit), or none of them will be carried out. In other words, if performance of any part of the logical unit of work fails, transaction coordinator module 305 directs transaction participant module 320 to cancel all parts of the logical unit of work and where any parts have already been started and/or completed, those parts will be rolled back (un-done).

Processing proceeds at operation S260, where transaction coordinator module 305 sends a test case request to test center module 310. Test center module returns a test case (not shown in the Figures). The test case is associated with the transaction. In some embodiments, the test case comprises a set of targeted test cases associated with the requested transaction. Each targeted test case is directed to the transaction coordinator or to a particular transaction participant of multiple transaction participants. For example, a test case directed to a transaction participant (TPM2) that performs a database operation may test TPM2's ability to obtain a lock on the database and write (then delete) a record in the database, thus ensuring that TPM2 does not have a problem gaining write access to the database.

Processing proceeds at operation S265, where test case injecting module 315 of transaction coordinator module 305, receives the test case and injects it into the logical unit of work. The logical unit of work is now called an "injected logical unit of work". In some embodiments, the test case comprises a suite of individual test cases directed to TPM1 and respectively corresponding instances of TPM2. In other embodiments, the suite of individual test cases may be directed only to a respectively corresponding subset of TPM2 instances, in which case no individual test cases are directed to some instances of TPM2 at all. In some embodiments, a given instance of TPM2 may have more than one test case directed to it. For simplicity in the present discussion, TPM2 involves just one instance of a transaction participant and just one associated test case.

Processing proceeds at operation S270, where transaction coordinator module 305 sends the injected unit of work to TPM2, thereby automatically distributing the test case as well. In response to receiving the injected logical unit of work, TPM2 extracts the test case from the injected logical unit of work, and proceeds to execute the test case. Upon successful completion of the test case (completion of the test case without error, and within a pre-defined time limit), TPM2 sends a "Test Successful" message back to TPM1.

Processing proceeds at operation S275, where TPM1 receives the "test successful" message.

Processing proceeds at operation S280, where TPM1, in response to receiving the "test successful" message from TPM2 (all tested instances of TPM2), TPM1: (i) sends an "execute transaction message" to TPM2; (ii) receives an "execute transaction OK" message from TPM2; (iii) sends a "commit" message to TPM2; (iv) receives a "commit done" message from TPM2; and (v) sends a transaction complete message to client application 112 (see FIG. 1A).

III. Further Comments and/or Embodiments

The term "context" used herein, refers to state information pertaining to a transaction and/or a coordinator and various participants involved in processing a logical unit of work (LUW) related to the transaction. While a LUW is being processed, the context can change based on the transaction resolution flow. For example, in a particular transaction flow, various possible states (contexts) include "prepare phase", "commit phase", and "rollback phase".

Figure 4:
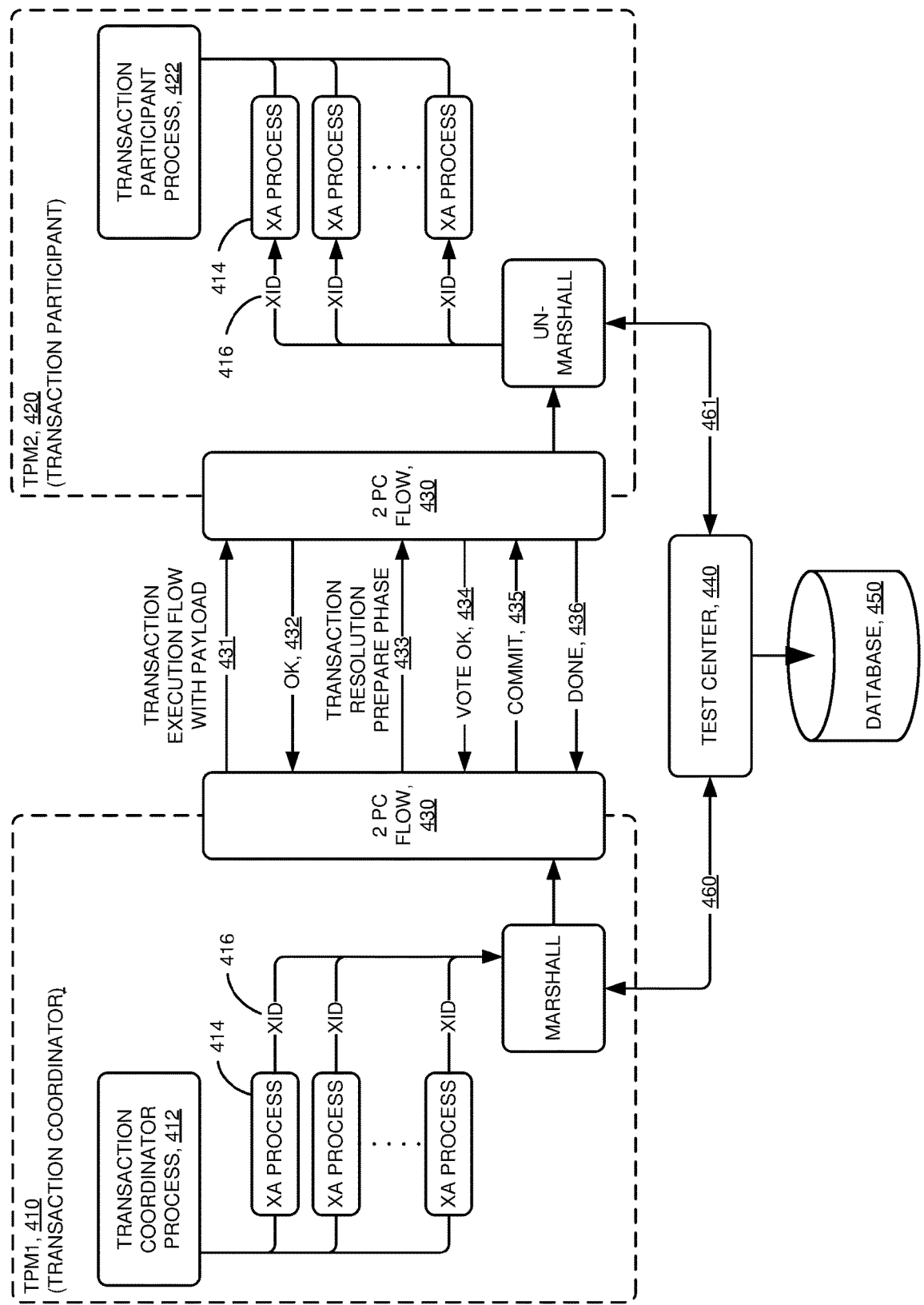
FIG. 4 is a block diagram showing a second embodiment system in accordance with the present invention.

FIG. 4 is a high level block diagram showing injection of test cases into a logical unit of work (LUW) associated with an online transaction, in the context of a two phase commit protocol. Some embodiments of the present invention enhance and improve upon a conventional two-phase commit protocol (2PC 430) by injecting, into the LUW, a set of test identifiers (test IDs) and the address (URL) of test center 440 from which the test cases are available for retrieval. (Note: In some embodiments, test center 440 may be referred to under any of the following names: "context driven test informer"; "context driven test center" (sometimes in connection with WebSphere Application Server (WAS)); and/or "WebSphere Application Server test center").

Information held in test center 440 may include (without limitation): (i) predefined test cases for use by various transaction monitors and resource monitors, in various contexts; (ii) test cases designed to detect (or simulate) bad database lock and deadlock timeout; (iii) test cases designed to detect (or simulate) duplicate record exception, resource manager SYNCPOINT failure, read only response, and/or illegal exception during transaction management/resource management prepare, etc.; (iv) recovery transaction states and test case context changes; and/or (v) dynamic changes of test case context for hybrid systems.

In some embodiments of the present invention, transaction process monitors (TPM1 410, and one or more instances of TPM2 420) operate in conformance with the X/Open Distributed Transaction Processing Standard, also known as extended architecture standard (XA standard). TPM2 420 represents any number of transaction participants operating in concert with the others, coordinated by TPM1 410. In some embodiments, TPM2 420 comprises a transaction participant process 422. The TPMs (or respective transaction participant processes 422) operate in concert to perform end-to-end testing of a transaction by using a coordinated set of test cases based on two phase/single phase transaction resolution from the transaction coordinator side (TPM1 410) as well as transaction participant side (TPM2 420) before performing and committing the transaction. The end-to-end testing contributes to improved transaction process quality assurance.

An example transaction process will now be described with reference to FIG. 4. TPM1 410 receives a transaction request (not shown in the Figures) from client application 112, of networked computers system 100 (see FIG. 1A). TPM1 410 consequently takes on the role of transaction coordinator with respect to the requested transaction and a corresponding logical unit of work (LUW). The request includes a network address of test center 440 (as a URL or shortened URL) and a corresponding test identifier (test ID, not shown) unique to the transaction and the LUW. In some embodiments, the transaction request includes test cases to be conducted by the various transaction process monitors (for example TPM1 410 and TPM2 420) and/or resource managers. In some embodiments, test cases reside in test center 440, to be called up as required. In some embodiments, some test cases are included in the transaction request and others reside in test center 440 to be retrieved as directed. In some embodiments, TPM1 410 modifies a generic test case resident in test center 440, based on information in the transaction request, to make the modified test cases specific to the requested transaction.

In some embodiments, client application 112 (FIG. 1A) is a credit processing application seeking to perform a credit transaction involving a customer, a merchant, a financial institution and an authentication service. In some embodiments, client application 112 is a supply chain application involving an order entry system, a supplier database, a goods tracking database, an inventory database, and a scheduling database, etc.

In the embodiment of FIG. 4, the first phase of the 2PC protocol, called the voting phase, comprises 431, 432, 433, and 434. In some embodiments of the present invention, the voting phase is subdivided to include a testing sub-phase, (comprising 431 and 432), wherein test cases are run by TPM1 410 and or TPM2 420.

In some embodiments of the present invention, the second phase, called the "transaction resolution" phase includes a "prepare" phase and a "commit phase". These are sometimes herein referred to as "commit-request" (prepare) and "commit".

Each individual test case has a unique test identifier (test ID), and is based on the "context" or "state" of the transaction at any given processing stage. A test case may be dynamically changed or swapped out with another test case in response to a context change. For example, suppose TPM2 420, in the "voting phase" has completed transaction execution, has voted by sending (434) an "OK" message to TPM1 410, and is waiting for a commit message. A problem arises at another transaction process monitor which votes to cancel the transaction. In response, TPM1 410 changes the context from "voting" to "rollback" and informs TPM2 420 of the context change. Consequently, TPM2 420 obtains a rollback-related test case from test center 440, based on the new context (rollback). TPM2 420 performs the rollback-related test case to verify rollback readiness, before actually performing the rollback (or signaling readiness to perform the rollback).

Voting phase (testing sub-phase): Continuing with the present example, transaction coordinator process 412, of TPM1 410, generates a transaction ID (XID 416) based on information included in the transaction request. Transaction coordinator process 412 (of TPM1 410) spawns (instantiates) a number of instances of extended architecture process (XA process 414) in conformance with the X/Open Distributed Transaction Processing Standard, to perform actions specified in the LUW. Each XA process 414 corresponds to a particular transaction participant or resource manager.

TPM1 410 marshals XA process 414, XID 416 and the LUW into a logical unit of work dataset (not shown), and sends (460) the logical unit of work dataset to test center 440. In response, test center 440, based on information in the logical unit of work dataset, associates the test ID with XID 416, and returns a test case whereupon TPM1 410 injects the test case into the LUW. In some embodiments, TPM1 410 extracts a test case from the transaction request, and injects the test case into the LUW.

TPM1 410 sends (431) the logical unit of work dataset to TPM2 420, whereupon TPM2 420 unmarshalls the logical unit of work dataset to extract information such as XID 416, transaction execution flow, payload information, and test case (or a test ID in which case TPM2 420 retrieves (461) the corresponding test case from test center 440, based on the test ID and the associated XID 416).

Once TPM2 420 successfully performs the test case, it sends (432) an "OK" message back to TPM1 410.

Voting phase (transaction execution sub-phase): Once TPM1 410 receives (432) "OK" messages from TPM2 420 and all other transaction participants, TPM1 410 sends (433) a "transaction resolution prepare" message (sometimes referred to as a "prepare flow" message) to TPM2 420. The "transaction resolution prepare" message instructs TPM2 420 to prepare to perform the transaction tasks embodied in the LUW. Preparation tasks may include acquiring resource locks, performing user authentication, making database entries, and/or making log entries that would enable the transaction to be rolled back if needed, etc. TPM2 420 performs the preparation tasks, and (if successful) returns (434) an "OK" vote to TPM1 410, to signal that preparations are successful. If TPM1 410 fails to receive an "OK" vote from all participants within the threshold time limit, TPM1 410 issues a "rollback" message (not shown in the Figures) to TPM2 (all participants), which then, proceed to un-do (roll back) the actions taken earlier in the first phase of the two-phase commit protocol, effectively cancelling the transaction altogether.

Commit phase: Once TPM1 410 receives (434) "OK" votes from all transaction participants (TPM2 420) within the threshold time limit, it sends (435) a "commit" message to TPM2 420. In response, TPM2 420 performs and commits the transaction (makes permanent all actions performed with respect to the LUW) and sends (436) a "done" message indicating successful completion and commission of the transaction. Once TPM1 410 receives "done" messages from all participants, it sends a "done" message (not shown) to client application 112 (FIG. 1A).

Transaction resolution phase: Once Customer Information Control System (CICS®) completes execution, TPM1 sends (433) a "prepare flow" message to begin the transaction resolution phase. Transaction coordinator process 412 verifies and executes (coordinates) with all participant transaction process monitors (such as TPM2 420), the test case received from test center 440. A credit card payment system, for example, may comprise a common business-oriented language (COBOL) program, running on a Customer Information Control System (CICS®, middleware for online transaction processing). The COBOL program may invoke an enterprise JavaBeans (EJB) program in WebSphere, to complete its LUW. In this example, CICS® invokes program execution by sending (431) transaction execution flow with payload to TPM2 420. The transaction execution flow includes such information as which servers (TPM2s) are to perform which actions on which databases, resources, authentication services, etc. The payload includes data required by the target programs (WebSphere and the EJB program in this example), such as a userid and/or account details.

TPM1 410 issues (433) a "prepare flow" call to TPM2 420, to initiate transaction resolution. The "prepare flow call" includes XID 416 which in turn includes the shortened URL identifying test center 440, and the test ID. In response to receiving the "prepare flow" call, TPM2 420 extracts XID 416 and the shortened URL from the "prepare flow" call. TPM2 420 contacts test center 440 (identified by the shortened URL) to retrieve the corresponding test case associated with the test ID. Test center 440 matches XID 416 received from TPM2 420, with XID 416 received from TPM1 410 (discussed above) and determines that both TPM1 410 and TPM2 420 are associated with the same LUW. Once determined, test center 440 sends the test case, based on the LUW, to TPM2 420. TPM2 420 performs the test case, and on successful completion, sends (434) an "OK" vote to TPM1 410.

In some embodiments, there are multiple instances of TPM2 420. Once all instances of TPM2 420 have sent (434) an "OK" vote to TPM1 410, TPM1 410 issues (435) a "commit flow" message to TPM2 420. In response to receiving the "commit flow" message, TPM2 420 commits to perform the transaction.

In some embodiments of the present invention, test center 440 creates a test setup with database(s) (such as database 450) that are associated with the LUW, based on the test case received from client application 112 (see FIG. 1A). For example, the test case might direct TPM2 420 to simulate creating a database 450 table lock situation that would be required during transaction resolution.

Figure 5A:
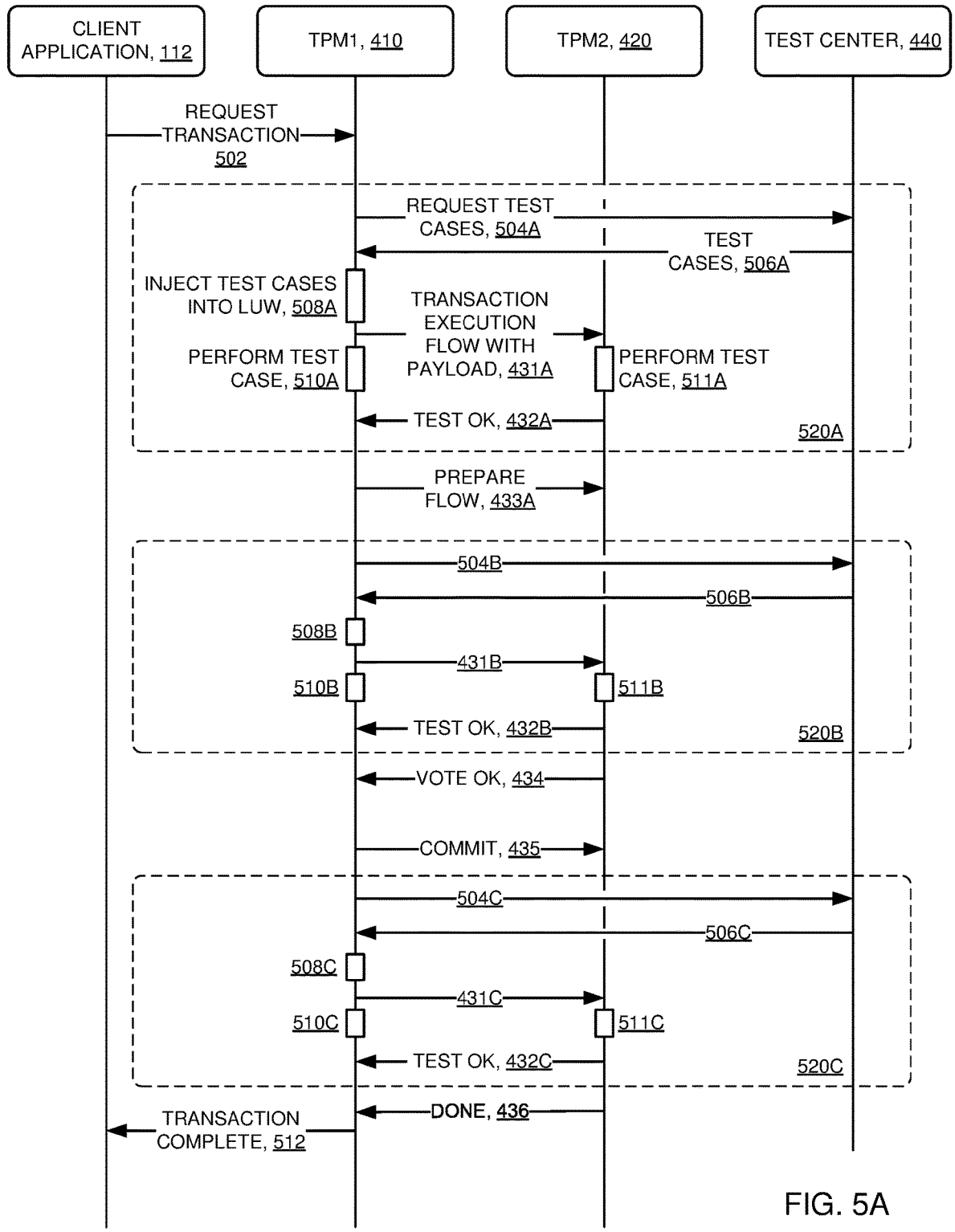
FIG. 5A is a sequence diagram showing a third embodiment method performed, at least in part, by the third embodiment system.
Figure 5B:
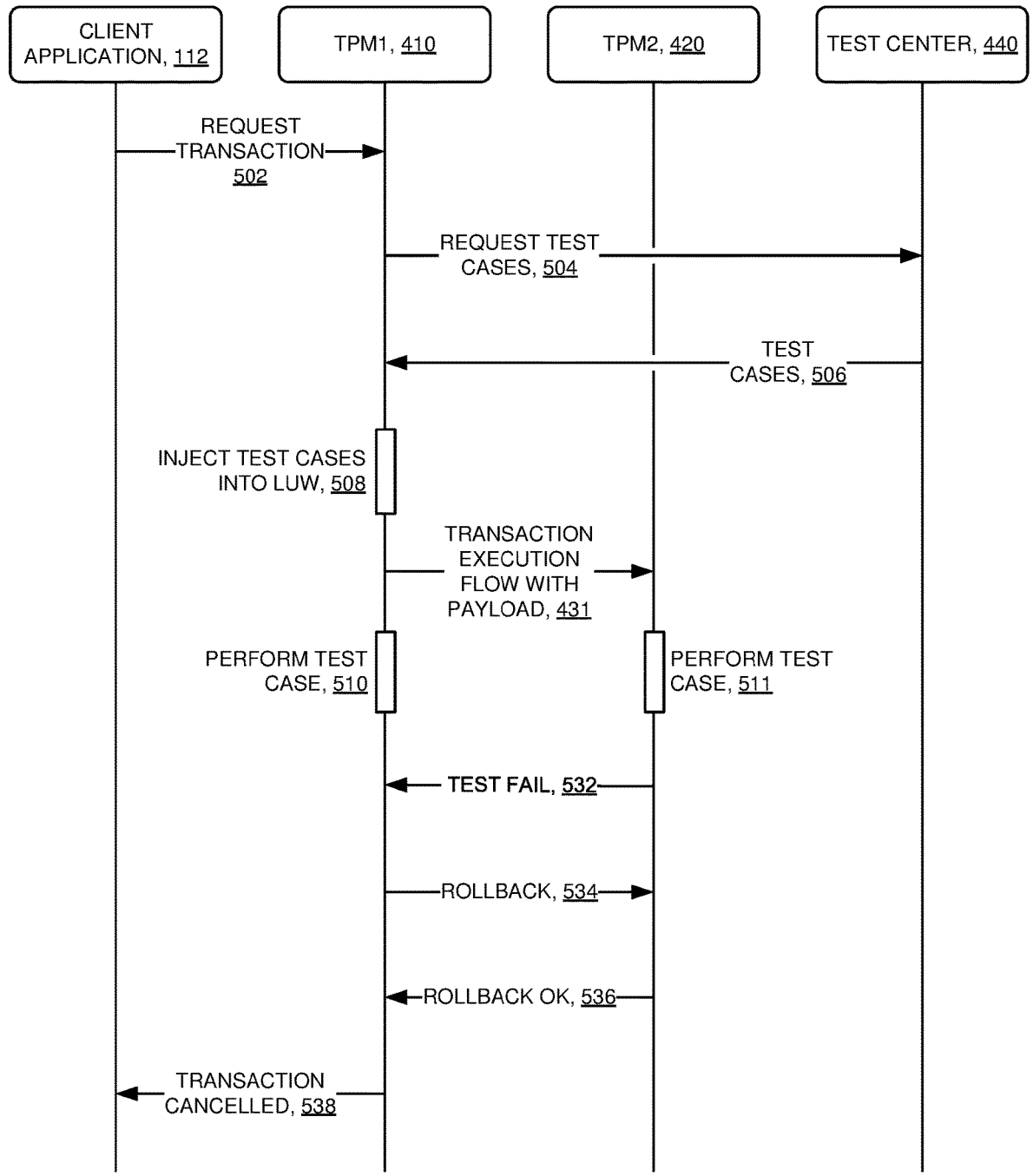
FIG. 5B is a sequence diagram showing a third embodiment method performed, at least in part, by the third embodiment system in accordance with the present invention.

FIGS. 5A and 5B are sequence diagrams of a method in accordance with some embodiments of the present invention.

The sequence diagram of FIG. 5A, shows a sequence of events performed in connection with successfully performing a transaction request. Client application 112 (FIG. 1A) sends (502) a transaction request to TPM1 410, which assumes the role of transaction coordinator. TPM1 410 interacts (504A, 506A) with test center 440 (FIG. 4) to obtain a set of test cases.

TPM1 410 injects (508A) the test cases into a logical unit of work (LUW) associated with the transaction.

TPM1 410 sends (431A) the LUW, which lays out a transaction execution flow, and includes a payload, to transaction coordinator TPM2 420 (FIG. 4, one of perhaps multiple transaction coordinators). The payload includes data, such as a userid and/or account details, required by the target programs.

TPM2 420 performs (511A) any test case directed to it, that has been injected into the LUW by TPM1 410. In conjunction, TPM1 410 performs any test case directed to TPM1 410 as well.

Once TPM2 420 successfully performs the test case, it sends (432A) a "test OK" message to TPM1 410.

Assuming TPM1 410 also successfully performs it's assigned test case, TPM1 410 sends (433A) a prepare flow message to TPM2 420. The sequence of operations enclosed in the dashed-line rectangle 520A (that is 504A, 506A, 508A, 431A, 510A, 511A, and 432A) are again performed (enclosed in the dashed-line rectangle 520B, representing respectively similar operations 504B, 506B, 508B, 431B, 510B, 511B, and 432B), except this time the test cases are specific to the preparation phase context of the transaction.

Once the operations enclosed in the dashed line rectangle 520B have been completed, TPM2 420 sends (434) a "vote OK" message to TPM1 410 indicating successful performance of the assigned test case and transaction execution flow.

In response to receiving the "vote OK" message, TPM1 410 sends (435) a commit message to TPM2 420, instructing TPM2 420 (and all involved transaction coordinators) to commit the transaction.

The sequence of operations enclosed in the dashed-line rectangle 520B (that is 504B, 506B, 508B, 431B, 510B, 511B, and 432B) are again performed (enclosed in the dashed-line rectangle 520C, representing respectively similar operations 504C, 506C, 508C, 431C, 510C, 511C, and 432C), except this time the test cases are specific to the commit phase context.

Once TPM2 420 (and all involved transaction coordinators) have committed the transaction, TPM2 420 sends (436) a "commit done" message to TPM1 410. In response, TPM1 410 sends (512) a "transaction complete" message to client application 112.

Some embodiments of the present invention, in addition to executing tests at a transaction execution phase, also perform test cases at transaction resolution phase. For example: (i) in some embodiments, TPM2 420 performs a sleep test during the prepare phase and monitors the transaction resolution behavior; (ii) in some embodiments, TPM2 420 explicitly performs a database lock during the commit phase and tests the transaction behavior; and (iii) in still other embodiments, the shortened URL (http://tc.was/BuCkeT?TPM=tpm1&TestID=sleepTest&XA=prepare) instructs the transaction participant to sleep ("Test ID=sleepTest") and identifies the stage ("XA=prepare") within the two-phase commit protocol with which the test is associated.

The sequence diagram of FIG. 5B, shows a sequence of events performed in connection with performing a transaction request, similar to the sequence shown in FIG. 5A, except this time, an error is detected in performance of a test case by a transaction coordinator. Client application 112 (FIG. 1A) sends (502) a transaction request to TPM1 410, which assumes the role of transaction coordinator. TPM1 410 interacts (504 and 506) with test center 440 (FIG. 4) to obtain a set of test cases.

TPM1 410 injects (508) the test cases into a logical unit of work (LUW) associated with the transaction.

TPM1 410 sends (431) the LUW, which lays out a transaction execution flow, and includes a payload, to transaction coordinator TPM2 420 (FIG. 4, one of perhaps multiple transaction coordinators). The payload includes data, such as a userid and/or account details, required by the target programs.

TPM2 420 performs (511) a test case directed to it, that has been injected into the LUW by TPM1 410. In conjunction, TPM1 410 performs (510) any test case directed to TPM1 410 as well.

TPM2 420 encounters an error while performing the test case. In response, TPM2 420 sends (532) a "test fail" message to TPM1 410. In some embodiments, the "test fail" message is referred to as a "NOT OK" vote.

In response to receiving the "test fail" message, TPM1 410 sends (534) a "rollback" message to TPM2 420.

In response to receiving the "rollback" message, TPM2 420 rolls back any transaction preparations so far undertaken and sends (536) a "rollback OK" message to TPM1 410.

TPM1 410, responding to the "rollback OK" message, sends 538 a "transaction cancelled" message to client application 112.

In some embodiments of the present invention, a transaction process monitor (TPM) to resource manager (RM) or a TPM to TPM interaction has two primary flows: (i) a transaction flow; and (ii) a SYNCPOINT flow. In some embodiments, a job is executed as part of the transaction flow. The job may be a distributed program link, or an invocation of an Enterprise JavaBean (EJB), etc. Coordination between the coordinating TPM and the participating TPMs/RMs happens during the SYNCPOINT flow.

Once a transaction application execution completes, it is the responsibility of a transaction processing monitor (TPM) to complete the transaction resolution (SYNCPOINT) flow to ensure data consistency and integrity across TPMs in a single LUW.

Some embodiments of the present invention inject a test case into a logical unit of work LUW corresponding to an online transaction. A transaction process monitor (TPM) receives the LUW, interfaces with a test center to obtain a test case, and performs the test case in advance of performing actions prescribed by the LUW for the TPM. In some embodiments, the TPM performs the prescribed LUW actions, the results of which are monitored by the test case. The result of the test case (for example, "pass" or "fail") factors in to the decision, made by the transaction coordinator, to commit or roll back the transaction.

As a transaction LUW flow spreads across multiple heterogeneous transaction management systems adhering to a two-phase commit protocol, some embodiments of the present invention create a test-driven approach to detect potential problems before a transaction is committed. If the testing turns up a problem, embodiments react accordingly. Possible reactions to a "fail" test result include: (i) cancelling and re-starting the transaction; (ii) pausing transaction execution processing at one or more transaction process monitors for a pre-determined time limit followed by re-trying (and/or re-testing) the action that caused the test "fail" result; and/or (iii) performing a remedial action (such as obtaining a database access authorization) and then repeating the test that turned up the problem.

Some embodiments of the present invention may include one, or more, of the following features, characteristics, and/or advantages: (i) dynamically creates a test case for each logical unit of work (LUW) based on the LUW flow between transaction managers; and/or (ii) transaction coordinator may dynamically determine the transaction participant (TPM) test case based on the LUW flow and the other participant resource manager behavior.

In some embodiments of the present invention, when a client application initiates a transaction request, the request includes information associated with the client application. The information includes, for example, a test identifier (test ID) and a universal resource locator (URL, or shortened URL) or other addressing device, that points to a relevant test center. A transaction is associated with a logical unit of work (LUW) which comprises functions necessary to complete the transaction.

In some embodiments of the present invention, a transaction originates with a client application which initiates a transaction request. The first transaction process monitor to begin processing the request is designated as the transaction coordinator (TPM1). In some embodiments, the transaction request includes a transaction identifier (XID). In some embodiments, TPM1 creates the XID. The XID is based on, or at least associated with, the test ID and the shortened URL.

The transaction coordinator propagates the test ID and the shortened URL to subsequent transaction process monitors, designated as transaction participants (TPM2), which are involved in processing the same LUW. XID is a data frame which identifies at least the transaction participant(s) and their respective capabilities. When TPM1 receives XID data, it parses and marshals the XID data and selects the test case details (test ID, etc., based on the XID payload), associated with completing the transaction. The payload includes data required by the target programs.

In some embodiments of the present invention, a TPM and/or client application refers a test case to a test center. The TPM and/or client applicant may change a test case based on a LUW flow, which in turn is based on the XID and test ID artefacts. Because the test case is associated with a test ID and an XID, any TPM (coordinator and/or participant) may change the test case dynamically, based on the test ID, the XID and/or the LUW execution flow.

Some embodiments of the present invention perform operations described in the following series of numbered paragraphs.

(i) A transaction manager (also sometimes herein referred to as a transaction process monitor, (TPM)) receives a transaction ID (XID) originating from a client transaction;

(ii) The TPM inserts a test ID, and a shortened URL (for example, a network address) of a participating test center, into the XID. The TPM, by virtue of being the first transaction process monitor to be involved in the transaction, is now designated as transaction coordinator, also hereinafter designated as TPM1. Any other transaction process monitor(s) that become involved in the transaction are designated as transaction participants (TPM2, TPM3, etc.). This present example transaction involves just two transaction process monitors, TPM1 (transaction coordinator) and TPM2 (transaction participant). However, the reader should understand that TPM2 may be just one of multiple TPM participants in any given transaction.

(iii) TPM1 marshals XID, communicates with the test center, and extracts (receives) test case detail information from the test center, based on the test ID. TPM1 asks the test center to execute the specific transaction associated with the XID;

(iv) TPM1 updates the test center with information contained in the XID;

(v) TPM1 executes the test case and performs transaction resolution, coordinating relevant activities among all transaction process monitors (in this example, TPM1 and TPM2) that participate in the transaction;

(vi) Transaction participant (TPM2) un-marshals the XID to recover at least the test ID, and contacts the test center to get the test case identified by the test ID. TPM2 performs the un-marshalling of XID in a process that is the reverse of the marshalling process performed by the transaction coordinator (TPM1 410) in paragraph (iii) above.

(vii) TPM2 executes the test case and completes the transaction.

Some embodiments of the present invention may include one, or more, of the following features, characteristics, and/or advantages: (i) provides for automatic injection of tests; (ii) does not require changes to existing implementations; (iii) is adaptable by transaction mangers; (iv) is compatible with existing systems; (v) maintains backward compatibility with conventional online transaction processing systems; (vi) creates the transaction participant test case dynamically based on the transaction execution in same LUW at transaction coordinator side; (vii) automatically injects test cases without any changes to the existing TPM or resource managers implementation; and/or (viii) provides a common repository containing test artifacts with dynamic test cases based on LUW flow. Further with respect to items (i) and (vii) above, in some embodiments of the present invention, TPM1 injects the test case information into the LUW. TPM1 subsequently propagates the injected LUW to the transaction participants.

Figure 6:
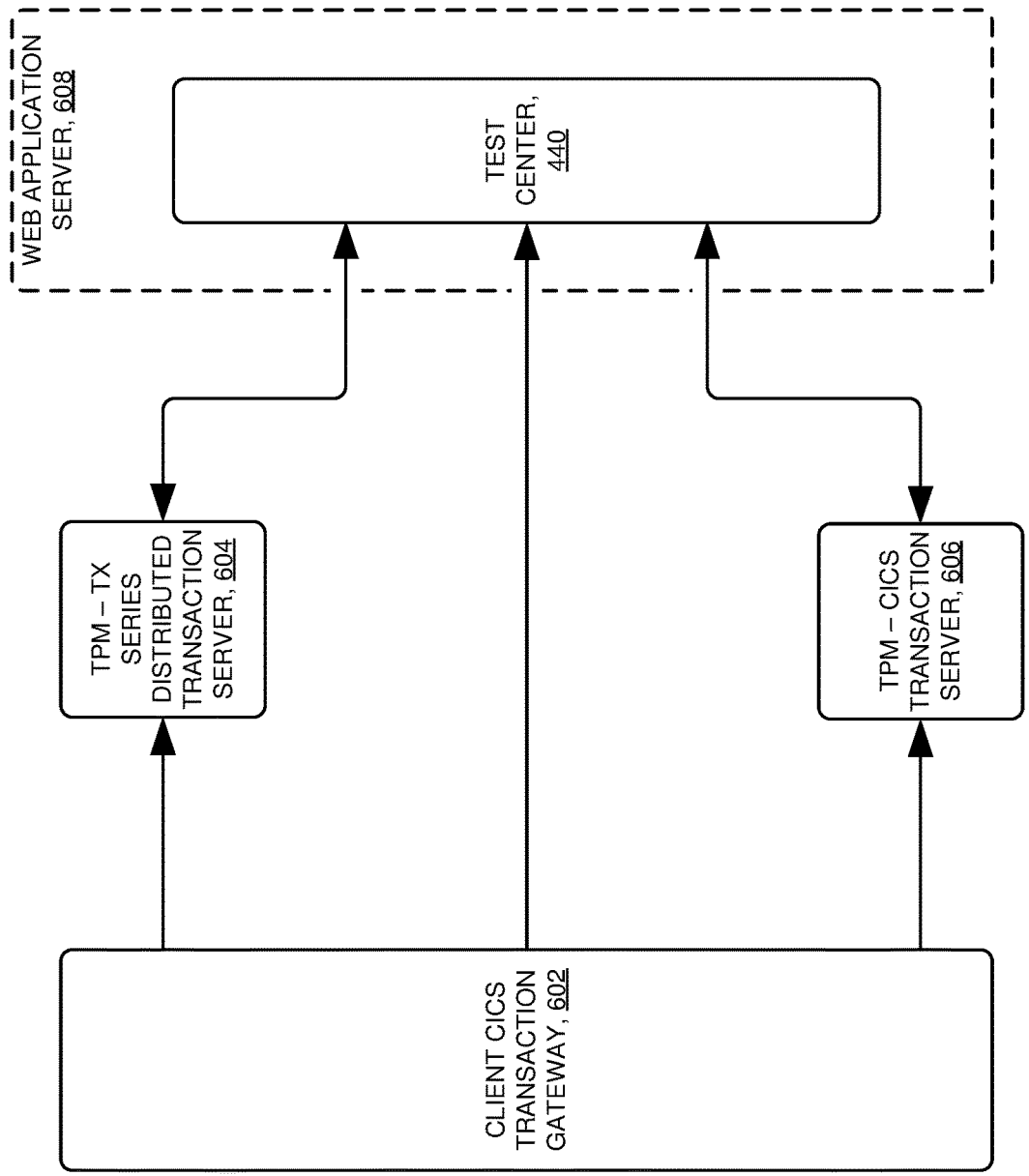
FIG. 6 is a functional block diagram showing at least a portion of a fourth embodiment system in accordance with the present invention.

FIG. 6 is a block diagram showing relationships between servers (TPM—TXSeries distributed transaction server 604 and TPM—CICS® transaction server 606) and test center 440 in accordance with some embodiments of the present invention. A client system such as client application 112 (see FIG. 1A), acting through client CICS® transaction gateway 602, can give input to (or otherwise interact with) any transaction server such as: (i) TPM—TXSeries distributed transaction server 604; (ii) TPM—CICS® transaction server 606; and/or (iii) WebSphere application server 608, to name a few examples. Various transaction coordinator servers may create the transaction ID (XID) in any given case. In some embodiments, selection of which server creates the XID is based on input from the test case. The transaction server (604, 606, or 608) executes the test case during transaction resolution, based on the test case retrieved from test center 440 and the XID prepared (in some embodiments) by TPM1 410 (see FIG. 4).

In some embodiments of the present invention, either (i) TPM—TXSeries distributed transaction server 604 or (ii) TPM—CICS® transaction server 606, creates the XID for two-phase communication (based on the shortened URL and the test ID) and starts the LUW based on information in the test case. In some embodiments, client CICS® transaction gateway 602 updates the test case, in test center 440, such that the test ID is made part of, and/or associated with, the test case.

Figure 7:
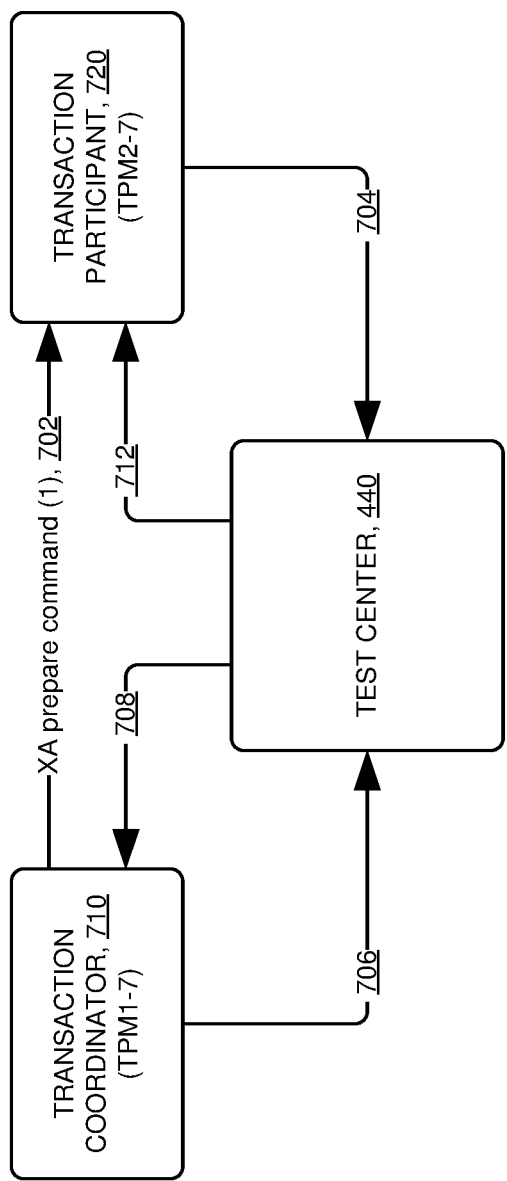
FIG. 7 is a functional block diagram showing at least a portion of a fifth embodiment system in accordance with the present invention.

FIG. 7 is a block diagram showing certain communications that take place among TPM1-7 710 (transaction coordinator), TPM2-7 720 (transaction participant), and test center 440 in accordance with some embodiments of the present invention. TPM1-7 710 and TPM2-7 720 each contact test center 440, to retrieve a respective test case associated with the same LUW. In other words: (i) TPM1-7 710 retrieves a test case specific to its transaction coordinator role in the LUW; and/or (ii) transaction participant 720 retrieves a test case specific to its transaction participant role in the LUW. In some embodiments, there are multiple transaction participants and each given participant retrieves a test case specific to the given participant or to at least a subset of transaction participants involved in the transaction. Some participant test cases may be directed to more than one transaction participant while other participant test cases may be specific to particular respectively corresponding transaction participants.

The following discussion illustrates an example scenario using the test cases in accordance with some embodiments of the present invention. As shown in FIG. 7, TPM1-7 710 issues XA prepare command (1) 702, to transaction participant 720, in connection with the first phase of transaction resolution for a transaction LUW.

In conjunction with sending XA prepare command (1) 702, TPM1-7 710 also sends (706) a request for a test case from test center 440. TPM1-7 710 may send the request before, after, or in conjunction with sending XA prepare command (1) 702 to transaction participant 720. The test case requested by TPM1-7 710 will be associated with the transaction, and may be specific to the role, hardware configuration and/or software configuration of TPM1-7 710.

In an embodiment, the test case request includes the following (fictitious) shortened URL: "http://tc.was/BuCkeT?TPM=tpm1&TestID=sleepTest&XA=prepare".

Parameters in the shortened URL include: (i) "TPM=tpm1"—identifies the requestor as the transaction coordinator; (ii) "Test ID=sleepTest"—identifies the test requested ("sleepTest"); and/or (iii) "XA=prepare"—identifies the stage ("prepare") within the two-phase commit protocol with which the test is associated. In some embodiments of the present invention, the shortened URL includes other parameters not shown in the URL example above.

Test center 440 responds to the test case request by returning (708) a "sleepTest" specific to TPM1-7 710, and associated with the transaction. In some embodiments, client CICS® transaction gateway 602 (see FIG. 6) updates the test case, in test center 440, such that the test ID is made part of, and/or associated with, the test case. In this example scenario, "sleepTest" is a script that causes TPM1-7 710 to wait (sleep) for 20 seconds after sending XA prepare command (1) 702. This will be discussed in more detail below.

Meanwhile, transaction participant 720 (TPM2), in response to receiving the XA prepare command, sends a request (704) to test center 440, to retrieve a test case associated with the transaction. Included in the request to test center 440 is the following (fictitious) shortened URL: http://tc.was/BuCkeT?TPM=tpm2&TestID=TerminateProcess&XA=prepare Parameters in the shortened URL include: (i) "TPM=tpm2"—identifies the requestor as transaction participant 720; (ii) "TestID=TerminateProcess"—identifies the test requested ("TerminateProcess"); and/or (iii) "XA=prepare"—identifies the stage ("prepare") within the two-phase commit protocol with which the test is associated. In some embodiments of the present invention, the shortened URL includes other parameters not shown in the URL example above.

Test center 440 responds to the request (704) by returning (712) a "TerminateProcess" test case specific to transaction participant 720, and associated with the transaction. "TerminateProcess" is a script that causes transaction participant 720 to simulate terminating before sending a resolution result to TPM1-7 710.

In some embodiments, based on a positive response to XA prepare command (1) 702 (sometimes called a "willingness factor") received from transaction participant 720, TPM1-7 710 issues a "commit" command (initiating the transaction resolution phase).

Once TPM1-7 710 issues XA prepare command (1) 702, it waits (governed by parameters in the sleepTest received earlier) until it receives a response (or the test times out) from transaction participant 720. Meanwhile, transaction participant 720, performs the "terminateTest". Governed by parameters in the "terminateTest", transaction participant 720 terminates (or more precisely stated, simulates termination of its role in processing the transaction). Together, performance of these tests simulates the behavior of systems involved in performing the transaction in the event that the transaction participant should terminate unexpectedly during transaction resolution. Results from these tests provide a basis for: (i) taking corrective action (such as rolling back, re-starting, and/or re-routing the transaction) if the results deviate from those expected; and/or (ii) committing transaction resolution.

In some embodiments of the present invention, transaction coordinator (TPM1-7 710) is a CICS® transaction server and transaction participant (TPM2-7 720) is a WebSphere Application server. TPM1-7 710 and TPM2-7 720 may be connected with a proprietary protocol. A transaction LUW spans between (involves) these two systems (TPM1-7 710 and TPM2-7 720). Test cases are used to test the transaction resolution phase explicitly, based on the behaviors of TPM1-7 710 and TPM2-7 720.

A transaction process monitor (TPM, also sometimes herein referred to as transaction manager) that receives a request to perform a transaction from, for example, client application 112 (see FIG. 1A) becomes the transaction coordinator (TPM1). The transaction coordinator is responsible for sending a transaction resolution command to its participants. A transaction resolution conforms to a two-phase commit protocol (2PC) in some embodiments of the present invention. Two phases in the 2PC are: (i) a commit-request phase (sometimes called a "voting" phase or a "prepare" phase); and (ii) a commit phase (sometimes called "transaction resolution"). In each phase, some embodiments perform tests from both transaction coordinator side and the transaction participant side. Hence, some embodiments use different test cases for a transaction coordinator as for a transaction participant.

The two example test cases include "sleepTest" and "terminateTest" as discussed a few paragraphs above. In a sleep test, a transaction coordinator (TPM1) initiates a delay after issuing the prepare request, while it waits for a "prepare response" from a participant. Determining whether TPM1 receives the "prepare response" before or after timeout of the delay helps to determine the overall transaction LUW behavior in an embodiment within a heterogeneous distributed environment. A terminateTest is an example testcase where a transaction participant intentionally terminates after receiving the prepare request from the transaction coordinator. The termination test case helps to predict the behavior of the system during transaction resolution in case the transaction participant terminates abruptly (unexpectedly) while processing the LUW.

The number of test cases in an embodiment can vary, based, for example, on the complexity of the LUW, the number of involved transaction process monitors and resource managers, networking considerations, the nature of the transaction, the capability of the test center, and other factors.

Once a transaction starts execution of a logical unit of work (LUW) in the transaction coordinator, the transaction coordinator creates a transaction identifier (XID) associated with the LUW based on the testid and shortened URL. This method helps the transaction coordinator to propagate the testID and test center (shortened URL) information to transaction participant(s) involved in the LUW. The transaction managers (coordinator and participants) separately contact the test center based on the XID to get respectively corresponding testcases required for the LUW.

Figure 8:
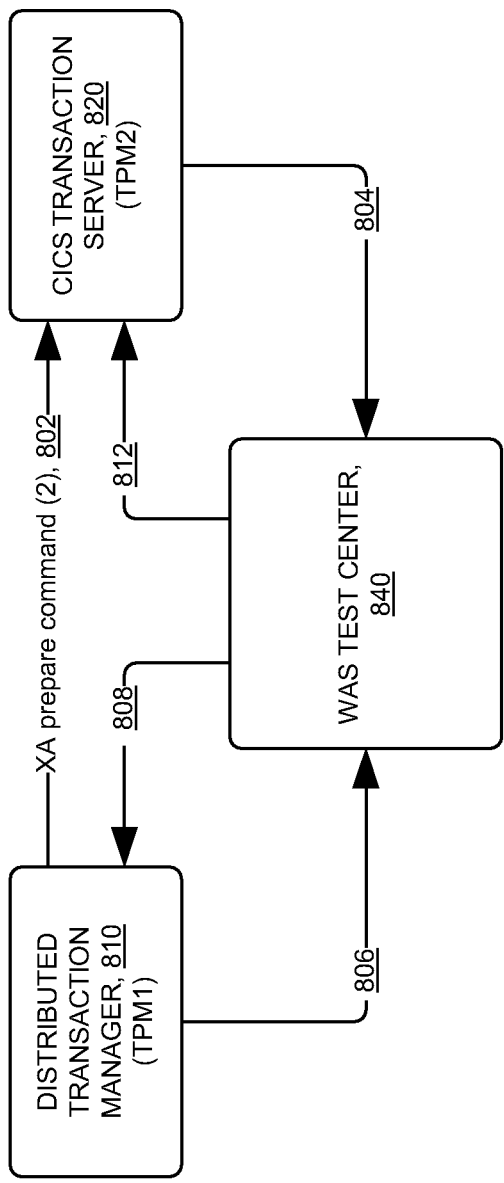
FIG. 8 is a functional block diagram showing at least a portion of a sixth embodiment system in accordance with the present invention.

FIG. 8 is a block diagram showing transaction coordinator and transaction participant executing the same test case on the same logical unit of work (LUW), in contrast to embodiments associated with FIG. 6, discussed above, in which transaction coordinator and transaction participant execute different test cases. In the embodiment of FIG. 8, distributed transaction manager 810 acts as the transaction coordinator (TPM1). CICS® transaction server 820 acts as a transaction participant (TPM2). WAS test center 840 is a WebSphere Application Server test center. In some embodiments, CICS® transaction server 820 is just one instance, of potentially multiple instances, of a transaction participant (TPM2).

The following discussion illustrates an example scenario using test cases in accordance with some embodiments of the present invention. As shown in FIG. 8, distributed transaction manager 810 (TPM1) issues XA prepare command (2) 802, to CICS® transaction server 820 (TPM2), in connection with the first phase of transaction resolution for a transaction LUW.

In conjunction with sending XA prepare command (2) 802, distributed transaction manager 810 also requests (806) a test case from WebSphere application server test center (WAS test center 840). Distributed transaction manager 810 may send the request (806) before, after, or simultaneously with sending XA prepare command (2) 802 to CICS® transaction server 820. The test case requested by distributed transaction manager 810 is associated with the transaction, and may be specific to the role, hardware configuration and/or software configuration of distributed transaction manager 810.

In an embodiment, the test case request (806) includes the following (fictitious) shortened URL: "http://tc.was/BuCkeT?TPM=tpm1&TestID=sleepTest&XA=prepare". Parameters in the shortened URL include: (i) "TPM=tpm1"—identifies the requestor as distributed transaction manager 810; (ii) "Test ID=sleepTest"—identifies the test requested ("sleepTest"); and/or (iii) "XA=prepare"—identifies the stage ("prepare") within the two-phase commit protocol with which the test is associated. In some embodiments of the present invention, the shortened URL includes other parameters not shown.

WebSphere Application Server test center 840 responds to the request (806) by returning (808) a "sleepTest" specific to distributed transaction manager 810, and associated with the LUW. In this example scenario, "sleepTest" is a script that causes distributed transaction manager 810 to wait (sleep) for 20 seconds after sending XA prepare command (2) 802. This will be discussed in more detail below.

Meanwhile, CICS® transaction server 820, in response to receiving the XA prepare command, sends a request (804) to WebSphere Application Server test center 840, to retrieve a test case associated with the transaction. Included in the request to WebSphere Application Server test center 840 is the following (fictitious) shortened URL: http://tc.was/BuCkeT?TPM=tpm2&TestID=sleepTest&XA=prepare Parameters in the shortened URL include: (i) "TPM=tpm2"—identifies the requestor as CICS® transaction server 820; (ii) "Test ID=sleepTest"—identifies the test requested ("sleepTest"); and/or (iii) "XA=prepare"—identifies the stage ("prepare") within the two-phase commit protocol with which the test is associated. In some embodiments of the present invention, the shortened URL includes other parameters not shown.

WebSphere Application Server test center 840 responds to the request (804) by returning (812) a "sleepTest" test case specific to CICS® transaction server 820, and associated with the transaction. "sleepTest" is a script that causes CICS® transaction server 820 to sleep "pause" for 2 seconds.

In some embodiments, based on a positive response to XA prepare command (2) 802 (sometimes called a "willingness factor") received from CICS® transaction server 820, distributed transaction manager 810 issues a "commit" command (initiating the transaction resolution phase).

Once distributed transaction manager 810 issues XA prepare command (2) 802, it waits (governed by parameters in the sleepTest received earlier) until it receives a response (or the test times out) from CICS® transaction server 820. Meanwhile, CICS® transaction server 820, performs the "terminateTest". Governed by parameters in the "terminateTest", CICS® transaction server 820 terminates (or more precisely stated, simulates termination of its role in processing the transaction). Together, performance of these tests simulates behavior of systems involved in performing the transaction in the event that the transaction participant should terminate unexpectedly during transaction resolution. Results from these tests provide a basis for: (i) taking corrective action (such as rolling back, re-starting, and/or re-routing the transaction) if the results deviate from those expected; and/or (ii) committing transaction resolution.

In some embodiments, a test case can be any test, not only a "sleep test" or "terminate test" as discussed above. A test case may call for simulation of any task, such as making a debit or credit entry in a banking context, or making a database update (for instance, an insertion or a deletion), to name just two examples. In the case of a 2-second sleep test, the server is commanded to pause for 2 seconds. The sleep test may simply test a pause between any two commits. If the pause lasts for 2 seconds (within a threshold tolerance, plus or minus), the test is considered successful. If the pause lasts for a significantly shorter or longer duration than 2 seconds (deviating, plus or minus, by more than the threshold tolerance), the test is considered a failure.

Figure 9:
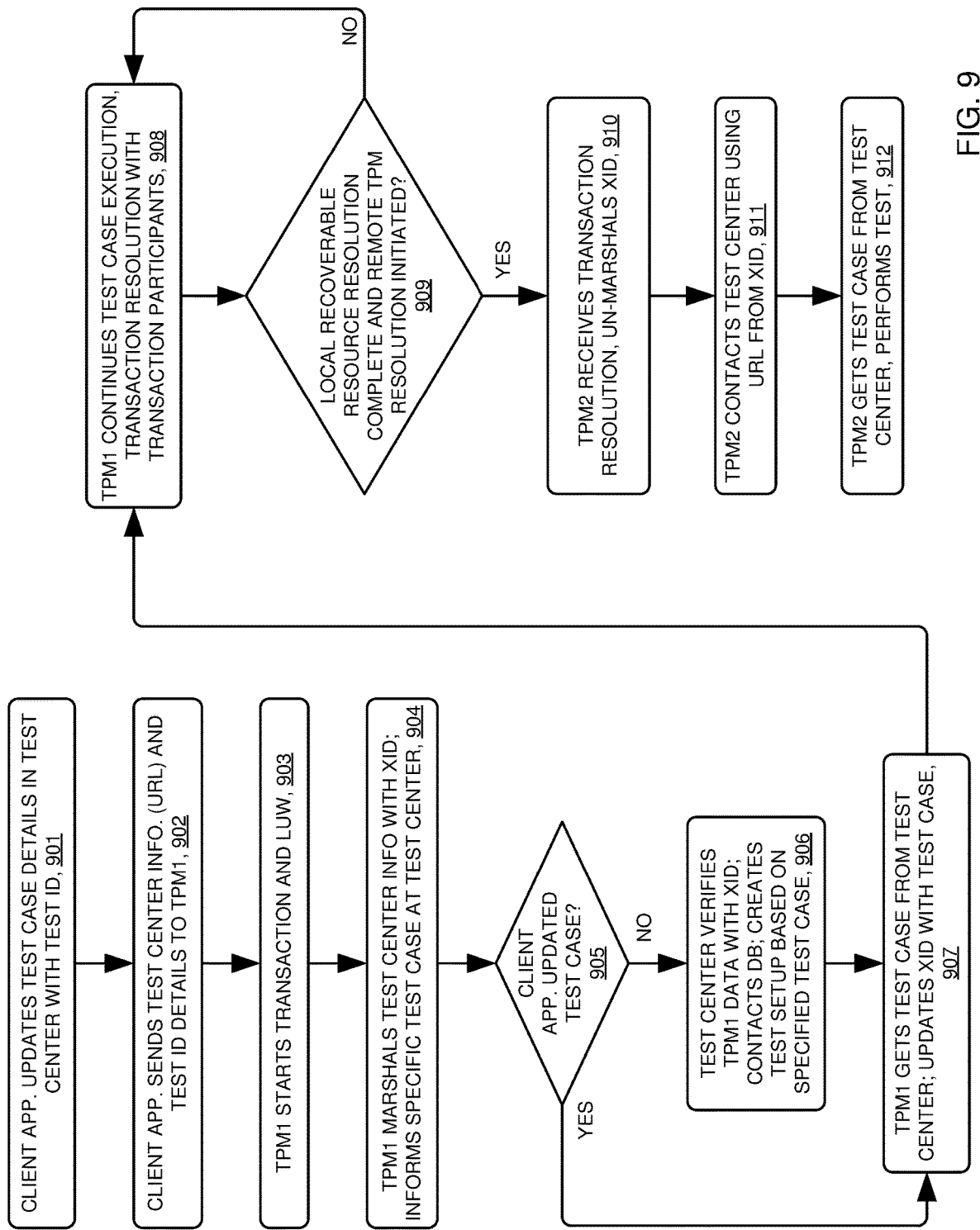
FIG. 9 is a flowchart showing a seventh embodiment method performed, at least in part, by the seventh embodiment system in accordance with the present invention.

FIG. 9 is a flowchart showing an online transaction test method performed in some embodiments of the present invention. Processing begins at operation 901, where client application 112, of networked computers system 100 (FIG. 1A) receives a command to perform an online transaction. Based on particulars of the transaction, client application 112 creates a transaction identifier (XID 416, see FIG. 4) and test identifier (testID, not shown in the Figures). Client application 112 updates a relevant test case that is resident in test center 440 (FIG. 4) with the testID, to associate (at test center 440) the testID with XID 416. In some embodiments, the test case is one test case among a set of generic test cases stored in test center 440. Alternatively, client application 112 may generate (or receive) a targeted test case designed specifically for a particular online transaction or a particular type of online transaction (such as a credit transaction, an inventory adjustment transaction, or a blockchain transaction, to name a few examples). The targeted test case may be directed to: (i) a specific transaction process monitor; (ii) the particular transaction as a whole; (iii) a specific part of the transaction; (iv) a particular extended architecture process (XA process 414, FIG. 4); (v) a particular resource associated with the transaction (such as a database, a network connection, an authentication system, etc.); and/or (vi) any process or resource, or combination thereof, associated with the transaction.

Processing proceeds at operation 902, where client application 112 sends information about test center 440 (such as a network address, for example a shortened universal resource locator (URL)), and testID details, to transaction coordinator process 412, of TPM1 410 (FIG. 4). In some embodiments, the testID details include the transaction identifier, that is XID 416 (FIG. 4).

Processing proceeds at operation 903, where, in response to receiving the information from client application 112 in operation 902 above, transaction coordinator process 412, of TPM1 410 starts the transaction and associated logical unit of work (LUW). In some embodiments of the present invention, when transaction coordinator process 412 starts the transaction, it spawns one or more XA process 414 (FIG. 4). XA process 414 is a process that conforms to X/Open Distributed Transaction Processing Standard. In some embodiments, XA process 414 is a process in conformance with another transaction processing standard. Regardless of the standard(s) to which XA process 414 conforms, the one or more XA process 414 collectively perform, or cause to be performed, the LUW associated with the transaction. In some embodiments, transaction coordinator process 412 assigns a transaction ID (XID 416, FIG. 4) and associates XID 416 with each XA process 414. Alternatively, in some embodiments, client application 112 (FIG. 1) assigns XID 416 to the transaction and passes XID 416, at operation 902 above, to TPM1 410 (FIG. 4), which passes it on to transaction coordinator process 412 and subsequently to the one or more XA process 414.

Processing proceeds at operation 904, where TPM1 410 (FIG. 4) marshals the one or more XA process 414, including XID 416, and information about test center 440, into a test information dataset (not shown), and sends (FIG. 4, 460) the test information dataset to test center 440 (FIG. 4).

Processing proceeds at decision 905, where test center 440, in response to receiving the test information dataset determines whether the test case had been updated (for example, by client application 112 (FIG. 1A), or by any other process associated with the LUW). If the test case had not been updated (decision 905, "No" branch), processing proceeds at operation 906 and thereafter at operation 907. If the test case had been updated (decision 905, "Yes" branch), processing proceeds at operation 907.

If the test case had not been updated (decision 905, "No" branch), processing proceeds at operation 906 where test center 440 verifies the transaction coordinator data associated with XID 416, based on information derived from the test information dataset. Test center 440 makes contact with database 450 (FIG. 4) to create a test setup using a test case based on information in the test information dataset. Processing subsequently proceeds at operation 907.

If the test case had been updated (decision 905, "Yes" branch), processing proceeds at operation 907, where TPM1 410 obtains the test case from test center 440 and updates the XID with information derived from the test case.

Processing proceeds at operation 908, where TPM1 410 proceeds with test case execution and transaction resolution, in concert with all participating TPMs (such as TPM2 420, FIG. 4).

Processing proceeds at decision 909, where TPM1 410 determines if local recoverable resource resolution is complete and remote TPM (such as TPM2) resolution has been initiated. If local recoverable resource resolution is not complete or remote TPM resolution has not been initiated (decision 909, "No" branch), processing returns to operation 908.

If local recoverable resource resolution is complete and remote TPM resolution has been initiated (decision 909, "Yes" branch), processing proceeds at operation 910, where TPM2 420 receives transaction resolution and un-marshals XID 416.

Processing proceeds at operation 911, where TPM2 420 makes contact (FIG. 4, 461) with test center 440 as identified by the shortened URL recovered from XID 416 that was un-marshaled at operation 910 above.

Processing proceeds at operation 912, where TPM2 420 (FIG. 4) retrieves the test case from test center 440 (FIG. 4). TPM2 420 performs one or more tests based on the test case. Once transaction coordinator (TPM1 410) and all instances of transaction participant (TPM2 420) (see FIG. 4) have successfully completed their assigned test cases (meaning they sent (432, FIG. 4) an "OK" vote, TPM1 410 sends (433, FIG. 4) an execute transaction command to all instances of TPM2 420 which then proceed to perform transaction resolution, vote "OK" (assuming no problems), receive (435) commit command, commit the transaction, and send (436) a "done" message, to inform TPM1 410 of the successful commit operation, and completion of the final resolution of the LUW.

Some embodiments of the present invention may include one, or more, of the following features, characteristics, and/or advantages: (i) dynamically and automatically injects transactional test cases into logical units of work (LUWs) without requiring changes to the existing transaction processing middleware or the resource managers; (ii) provides a method for simulating various conditions/tests that are easy to adapt to the existing implementations of the transaction managers and resource managers without requiring any fundamental changes; (iii) works in the existing distributed transactional infrastructure; (iv) receives transaction request from client application and automatically assigns test ID and test center (shortened URL) information to each transaction standard (XID); (v) enables transaction coordinator/manager (TPM) to marshal the XID and extracts test case details from test center based on the test ID; (vi) dynamically creates test cases for each transaction participant/managers by updating test center information at transaction coordinator side; (vii) dynamically provides created test cases to each TPM from the test center and executes the received test cases within all participating TPMs, for optimizing quality assurance of a hybrid online transaction processing (OLTP) environment; (viii) creates the transaction participant test case dynamically based on the transaction execution in same LUW at transaction coordinator side based on the XID of the transaction; (ix) the transaction execution receives the test id from the test center through the shortened URL and converts that information as XID to notify the test center for further transaction participant systems; (x) uses the XID for extracting the test case from test center (the XID dynamically identifies the corresponding test center for each transaction call on transaction participant systems; (xi) dynamically creates any test case based on the current LUW flow; (xii) determines the test case based on the transaction resolution behavior; (xiii) creates the transaction participant test case dynamically, based on the transaction execution of the same LUW by the transaction coordinator; (xiv) uses the XID for extracting the test case from test center; (xv) dynamically identifies a corresponding test center, based on the XID, for each transaction call on transaction participant systems; (xvi) dynamically selects the test cases at each resource manager; (xvii) automatically injects test case(s) into a LUW; and/or (xviii) provides a common repository containing test artifacts with dynamic test cases based on LUW flow.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
   receiving, from a client application, a first request to perform an online transaction, wherein the first request comprises a logical unit of work, and a transaction identifier;
   in response to receiving the first request, sending a second request, to a test center, for a test case based on the transaction identifier;
   receiving, from the test center, the test case;
   in response to receiving the test case, injecting the test case into the logical unit of work to generate an injected logical unit of work;
   sending the injected logical unit of work to a transaction participant;
   receiving, from the transaction participant, a first message, wherein the first message indicates a successful test;
   in response to receiving the first message, sending to the transaction participant, a second message comprising a first command to perform the online transaction;
   receiving, from the transaction participant, a third message wherein the third message indicates that the online transaction was performed successfully; and
   in response to receiving the third message, sending to the transaction participant, a fourth message comprising a second command to commit the online transaction.

2. The method of claim 1, further comprising:
   receiving, from the transaction participant, a fifth message wherein the fifth message indicates the second command to commit the online transaction has been successfully completed.

3. The method of claim 2, further comprising:
   in response to receiving the fifth message, sending a sixth message to the client application, indicating that the online transaction has been successfully completed;
   wherein the sending and receiving respectively to and from the transaction participant, are performed in conformance with a two-phase commit protocol.

4. The method of claim 1, wherein requesting the test case further comprises:
   instantiating an extended architecture process that conforms to an X/Open Distributed Transaction Processing Standard;
   marshalling at least the transaction identifier together with the logical unit of work to generate a logical unit of work dataset; and
   sending, to the test center, a test case request comprising the logical unit of work dataset.

5. The method of claim 1, wherein sending the injected logical unit of work to the transaction participant comprises:
   instantiating an extended architecture process that conforms to an X/Open Distributed Transaction Processing Standard;
   marshalling at least the transaction identifier together with the logical unit of work to generate a logical unit of work dataset; and
   sending the logical unit of work dataset to the transaction participant via a two-phase commit protocol process.

6. A computer program product comprising a computer readable storage medium having stored thereon program instructions programmed to perform:
   receiving, from a client application, a first request to perform an online transaction, wherein the first request comprises a logical unit of work, and a transaction identifier;
   in response to receiving the first request, sending a second request, to a test center, for a test case based on the transaction identifier;
   receiving, from the test center, the test case;
   in response to receiving the test case, injecting the test case into the logical unit of work to generate an injected logical unit of work;
   sending the injected logical unit of work to a transaction participant;
   receiving, from the transaction participant, a first message, wherein the first message indicates a successful test;
   in response to receiving the first message, sending to the transaction participant, a second message comprising a first command to perform the online transaction;
   receiving, from the transaction participant, a third message wherein the third message indicates that the online transaction was performed successfully; and
   in response to receiving the third message, sending to the transaction participant, a fourth message comprising a second command to commit the online transaction.

7. The computer program product of claim 6, further comprising program instructions programmed to perform:
   receiving, from the transaction participant, a fifth message wherein the fifth message indicates the second command to commit the online transaction has been successfully completed.

8. The computer program product of claim 7, further comprising program instructions programmed to perform:
   in response to receiving the fifth message, sending a sixth message to the client application, indicating that the online transaction has been successfully completed;
   wherein the sending and receiving respectively to and from the transaction participant, are performed in conformance with a two-phase commit protocol.

9. The computer program product of claim 6, wherein program instructions programmed to perform requesting the test case further comprises program instructions programmed to perform:
   instantiating an extended architecture process that conforms to an X/Open Distributed Transaction Processing Standard;
   marshalling at least the transaction identifier together with the logical unit of work to generate a logical unit of work dataset; and
   sending, to the test center, a test case request comprising the logical unit of work dataset.

10. The computer program product of claim 6, wherein program instructions programmed to perform sending the injected logical unit of work to the transaction participant comprises program instructions programmed to perform:
   instantiating an extended architecture process that conforms to an X/Open Distributed Transaction Processing Standard;
   marshalling at least the transaction identifier together with the logical unit of work to generate a logical unit of work dataset; and
   sending the logical unit of work dataset to the transaction participant via a two-phase commit protocol process.

11. A computer system comprising:
a processor set; and
a computer readable storage medium;
wherein:
- the processor set is structured, located, connected and/or programmed to run program instructions stored on the computer readable storage medium; and
- the program instructions include instructions programmed to perform:
  - receiving, from a client application, a first request to perform an online transaction, wherein the first request comprises a logical unit of work, and a transaction identifier;
  - in response to receiving the first request, sending a second request, to a test center, for a test case based on the transaction identifier;
  - receiving, from the test center, the test case;
  - in response to receiving the test case, injecting the test case into the logical unit of work to generate an injected logical unit of work;
  - sending the injected logical unit of work to a transaction participant;
  - receiving, from the transaction participant, a first message, wherein the first message indicates a successful test;
  - in response to receiving the first message, sending to the transaction participant, a second message comprising a first command to perform the online transaction;
  - receiving, from the transaction participant, a third message wherein the third message indicated that the online transaction was performed successfully; and
  - in response to receiving the third message, sending to the transaction participant, a fourth message comprising a second command to commit the online transaction.

12. The computer system of claim 11, further comprising program instructions programmed to perform:
- receiving, from the transaction participant, a fifth message wherein the fifth message indicates the second command to commit the online transaction has been successfully completed; and
- in response to receiving the fifth message, sending a sixth message to the client application, indicating that the online transaction has been successfully completed;
- wherein the sending and receiving respectively to and from the transaction participant, are performed in conformance with a two-phase commit protocol.

13. The computer system of claim 11, wherein program instructions programmed to perform requesting the test case further comprises program instructions programmed to perform:
- instantiating an extended architecture process that conforms to an X/Open Distributed Transaction Processing Standard;
- marshalling at least the transaction identifier together with the logical unit of work to generate a logical unit of work dataset; and
- sending, to the test center, a test case request comprising the logical unit of work dataset.

14. The computer system of claim 11, wherein program instructions programmed to perform sending the injected logical unit of work to the transaction participant comprises program instructions programmed to perform:
- instantiating an extended architecture process that conforms to an X/Open Distributed Transaction Processing Standard;
- marshalling at least the transaction identifier together with the logical unit of work to generate a logical unit of work dataset; and
- sending the logical unit of work dataset to the transaction participant via a two-phase commit protocol process.

* * * * *